United States Patent
Lee et al.

(10) Patent No.: US 9,874,957 B2
(45) Date of Patent: Jan. 23, 2018

(54) DEFORMABLE WEARABLE ELECTRONIC DEVICE

(71) Applicant: SAMSUNG ELECTRONICS CO., LTD., Suwon-si, Gyeonggi-do (KR)

(72) Inventors: Seon Ho Lee, Suwon-si (KR); Jin Hak Lee, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 68 days.

(21) Appl. No.: 14/993,286

(22) Filed: Jan. 12, 2016

(65) Prior Publication Data

US 2016/0224305 A1    Aug. 4, 2016

(30) Foreign Application Priority Data

Feb. 3, 2015   (KR) .................. 10-2015-0016936

(51) Int. Cl.
| G06F 1/16 | (2006.01) |
|---|---|
| G06F 3/041 | (2006.01) |
| G06F 3/14 | (2006.01) |
| G06F 3/01 | (2006.01) |
| G06F 3/0488 | (2013.01) |
| G09G 3/00 | (2006.01) |
| G06F 3/147 | (2006.01) |

(52) U.S. Cl.
CPC ............. *G06F 3/041* (2013.01); *G06F 1/163* (2013.01); *G06F 1/1652* (2013.01); *G06F 3/013* (2013.01); *G06F 3/014* (2013.01); *G06F 3/017* (2013.01); *G06F 3/0488* (2013.01); *G09G 3/001* (2013.01); *G06F 3/147* (2013.01); *G06F 2203/04102* (2013.01); *G09G 2340/0464* (2013.01); *G09G 2354/00* (2013.01); *G09G 2380/02* (2013.01)

(58) Field of Classification Search
CPC .................. G06F 1/163; G06F 1/1652; G06F 2203/04102; G06F 3/014; G06F 3/017; G06F 3/041; G06F 3/0488; G06F 3/1446; G06F 3/04886; G06F 1/16
See application file for complete search history.

(56) References Cited

U.S. PATENT DOCUMENTS

| 2008/0002528 | A1 | 1/2008 | Andren et al. |
|---|---|---|---|
| 2010/0117975 | A1* | 5/2010 | Cho ...................... G06F 1/1626 345/173 |
| 2013/0010405 | A1* | 1/2013 | Rothkopf ............ H04M 1/0216 361/679.01 |
| 2013/0278624 | A1* | 10/2013 | Abe ........................ G09G 5/363 345/619 |
| 2014/0043226 | A1* | 2/2014 | Lee ........................... G06F 3/03 345/156 |
| 2014/0085230 | A1* | 3/2014 | Sato ...................... G06F 1/1652 345/173 |

(Continued)

*Primary Examiner* — Hong Zhou
(74) *Attorney, Agent, or Firm* — Nixon & Vanderhye P.C.

(57) ABSTRACT

A wearable electronic device includes: a flexible display divided into a plurality of blocks, at least one block among the plurality of blocks configured to be folded, and at least one magnetic element disposed at both ends of the at least one block configured to be folded, said magnetic element configured to connect unfolded blocks to each other from among the plurality of blocks by connecting both ends of the at least one block configured to be folded when the at least one block configured to be folded is folded.

19 Claims, 14 Drawing Sheets

(56) References Cited

U.S. PATENT DOCUMENTS

| | | | |
|---|---|---|---|
| 2014/0245785 A1* | 9/2014 | Proud | A44C 5/0015 63/1.13 |
| 2014/0247252 A1* | 9/2014 | Lee | G09G 3/20 345/204 |
| 2014/0321073 A1* | 10/2014 | Hong | G06F 1/1652 361/749 |
| 2015/0227245 A1* | 8/2015 | Inagaki | G06F 3/0412 345/173 |
| 2016/0007697 A1* | 1/2016 | de Jong | A44C 5/2071 361/679.03 |
| 2016/0026381 A1* | 1/2016 | Kim | G06F 3/04817 715/761 |
| 2016/0188162 A1* | 6/2016 | Lee | G06F 3/04817 715/788 |

* cited by examiner

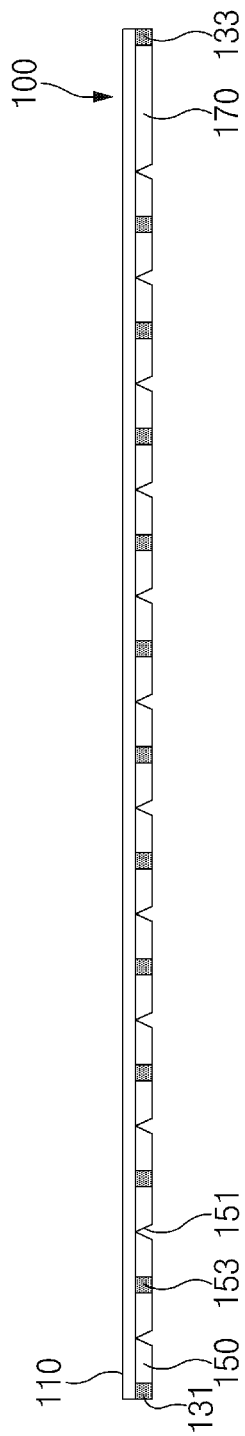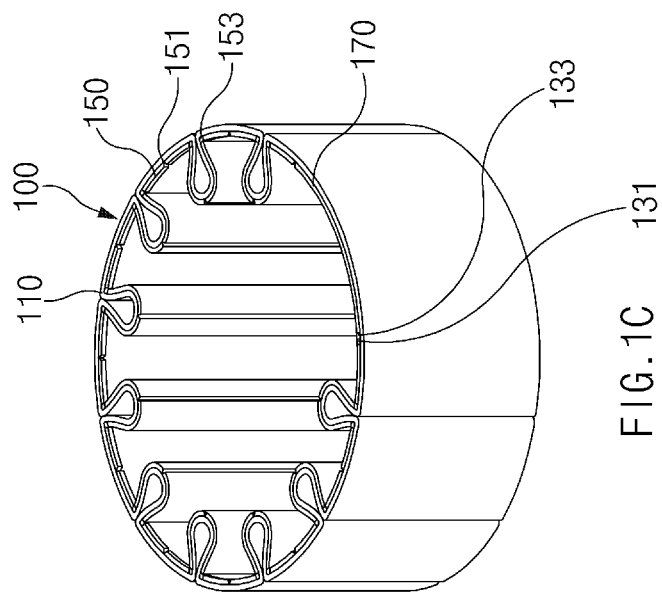

DEFORMABLE WEARABLE ELECTRONIC DEVICE

CROSS-REFERENCE TO RELATED APPLICATION

This application is based on and claims priority under 35 U.S.C. §119 to a Korean patent application filed on Feb. 3, 2015 in the Korean Intellectual Property Office and assigned Serial number 10-2015-0016936 the disclosure of which is incorporated by reference herein in its entirety.

FIELD

The present disclosure relates to wearable electronic device.

BACKGROUND

Since electronic devices have recently become more compact and slimmer, they have become easily carried. Such electronic devices are typically carried in pockets or by hands but may have a form of being worn by body parts or various structures. Electronic devices in a wearable form, that is, wearable electronic devices, may include a main body (for example, a processor, a display, or a memory) for performing original functions mainly and a wearing part (for example, a strap) protruding from the main body by a predetermined length and fixing the main body to a body part or various structures.

However, the wearable electronic devices are used in only one form. For example, a wearable electronic device in a band form (for example, a watch) is only worn by a wrist, an arm, or a head and used. Additionally, due to the natures of wearable electronic devices, a relatively small size of displays may be mounted thereon in comparison to other electronic devices. Accordingly, when a large display is required, an additional device is connected to an electronic device and used.

SUMMARY

Accordingly, an aspect of the present disclosure is to provide a wearable electronic device supporting a large display by configuring a wearing part of the wearable electronic device with a flexible display even when the wearable electronic device is deformed.

Another aspect of the present disclosure is to provide a wearable electronic device that can be deformed quickly and easily by configuring a tucked unit at a wearing part of the wearable electronic device.

In accordance with an aspect of the present disclosure, a wearable electronic device includes: a flexible display divided into a plurality of blocks; and at least one magnetic material disposed at both ends of at least one folded block among the plurality of blocks and configured to connect unfolded blocks to each other among the plurality of blocks by connecting both ends of the at least one folded block.

BRIEF DESCRIPTION OF THE DRAWINGS

These and other aspects of the disclosure will become more apparent from the following detailed description, taken in conjunction with the accompanying drawings, in which like reference numerals refer to like elements, and wherein:

FIG. 1B is a side view illustrating a deformable wearable electronic device when the entire electronic device is unfolded according to various embodiments of the present disclosure.

FIG. 1C is a perspective view illustrating a band form in which the electronic device is tucked according to various embodiments of the present disclosure.

DETAILED DESCRIPTION

Figure 1A:
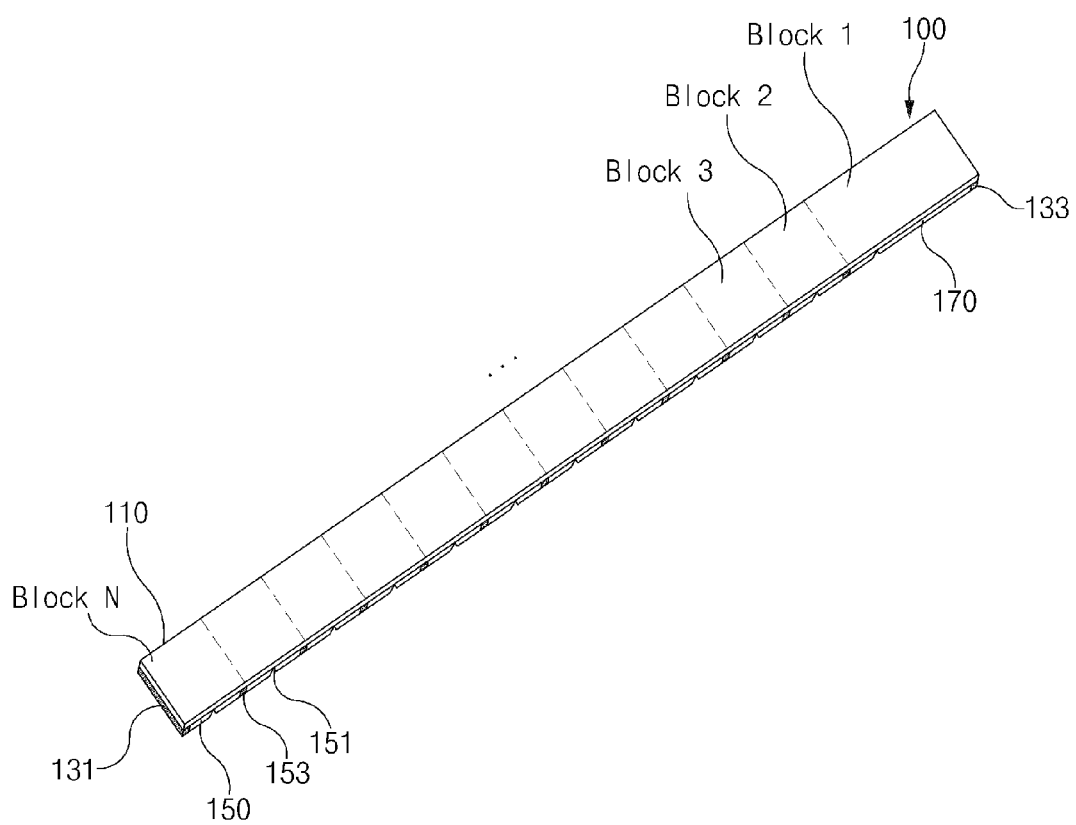
FIG. 1A is a perspective view illustrating a deformable wearable electronic device when the entire electronic device is unfolded according to various embodiments of the present disclosure.

Hereinafter, various embodiments of the present disclosure are disclosed with reference to the accompanying drawings. However, the disclosure does not limit various embodiments of the present disclosure to a specific embodiment and it should be understood that the present disclosure is intended to cover all the modifications, equivalents, and/or alternatives of this disclosure provided they come within the scope of the appended claims and their equivalents. With respect to the descriptions of the drawings, like reference numerals refer to like elements.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may, for example, refer to or denote a dedicated processor (for example, an embedded processor) for performing a corresponding operation or a general-purpose processor (for example, a CPU or application processor) for performing corresponding operations by executing at least one software program stored in a memory device.

Terms used in various embodiments of the present disclosure are used to describe embodiments of the present disclosure, and are not intended to limit the scope of other embodiments. The terms of a singular form may include plural forms unless they have a clearly different meaning in context. Otherwise, the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood peculiarly or as having an excessively formal meaning. In any case, even the terms defined in this disclosure cannot be interpreted as excluding embodiments of the present disclosure.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1A is a perspective view illustrating a deformable wearable electronic device when the electronic device is unfolded according to various embodiments of the present disclosure. FIG. 1B is a side view illustrating a deformable wearable electronic device when the electronic device is unfolded according to various embodiments of the present disclosure. FIG. 1C is a perspective view illustrating a band form in which the electronic device is tucked according to various embodiments of the present disclosure.

Referring to FIG. 1A, the electronic device 100 may include a display 110, a connection unit or connector (for example, a first connection unit 131 and a second connection unit 133), a tucked unit 150, and an operation module 170 comprising, for example, processing circuitry. As illustrated in the drawing, the electronic device may be realized as a wearing part with the display 110, the connection unit, and the tucked unit 150.

The display 110 may display various data (for example, texts, images, videos, icons, symbols, and so on). Additionally, the display 110 may include a touch screen, and for example, may receive a touch, gesture, proximity, or hovering input by using an electronic pen or a body part.

According to various embodiments of the present disclosure, the display 110 may be a deformable flexible display. For example, at least part of the display 110 may be provided to be bent, folded, or rolled.

According to various embodiments of the present disclosure, the display 110 may, for example, have a rectangular shape and the horizontal length of one surface (for example, the front surface) may be relatively longer than the vertical length. The horizontal length of the display 110 may be provided to allow the electronic device 100 to be worn on a body part or various structures. For example, the horizontal length may be provided to be longer by a predetermined size than the body part or the various structures.

According to various embodiments of the present disclosure, the display 110 may be divided into a plurality of blocks. For example, the display 110 may be divided into a plurality of areas by a predetermined interval. The plurality of blocks (or areas) may be conceptual separations, and not necessarily physical separations. For example, the plurality of blocks may be conceptual separations for separating tucked areas from untucked areas when the display 110 is deformed. When the display 110 is deformed, the tucked areas may, for example, refer to areas where a screen becomes unseen as being tucked in the bottom direction of the display 110.

According to various embodiments of the present disclosure, the display 110 may be configured with a plurality of block displays, for example, a plurality of physically divided displays. In this case, the plurality of block displays may be attached to the tucked unit 150 and may further include units for performing a function for electrically connecting the plurality of block displays in an area adjacent to the tucked unit 150.

The connection units may, for example, be disposed at both ends (for example, the boundary surface) of the display 110 to allow the display 110 to be bent and the ends to be coupled. For example, the first connection unit (e.g., a connector) 131 and the second connection unit (e.g., a connector) 133 are respectively disposed at both ends of the display 110, and may be configured to be coupled to each other. According to an embodiment of the present disclosure, when the display 110 is configured with a plurality of block displays, for example, when a plurality of physically divided block displays are connected in series, each connection unit (for example, the first connection unit 131 and the second connection unit 133) may be disposed at an end that is not connected to another block display among both ends of two block displays disposed at both end edges. According to various embodiments of the present disclosure, the connection unit may, for example, denote or refer to a means (or a device) for performing a coupling function such as a magnetic material, a hook, a lock device, an adhesive material, or the like.

The tucked unit 150 may support the display 110 to be deformed easily and quickly. For example, the tucked unit 150 may support a predetermined area (e.g., at least one of a plurality of blocks and a plurality of block displays) of the display 110 to be folded (e.g., tucked) and entered in the bottom direction of the display 110. According to an embodiment of the present disclosure, the tucked unit 150 may be attached to a predetermined bottom area of the display 110.

The tucked unit 150 may include a plurality of grooves 151 and a plurality of magnetic portions comprising materials 153. The groove 151 may, for example, aid in a function for inducing a predetermined area of the display 110 to be folded and disposed toward or entered in the bottom direction of the display 110. For example, the groove 151 may be disposed in a predetermined form in a predetermined bottom area of the display 110. For example, since a point where the groove 151 is disposed is thinner than an adjacent point in terms of the thickness (for example, a thickness including the display 110 and the tucked unit 150), it may be folded and entered first when the display 110 is deformed. Additionally, as the tucked unit 150 is configured in a predetermined bottom area of the display 110, the display 110 may be induced to be folded and disposed toward or entered in the bottom direction. The magnetic portions comprising a magnetic material 153 may be configured to perform a function for connecting untucked areas disposed at both sides (e.g., ends) of a tucked area. For example, the magnetic portions 153 may support untucked areas to be connected to each other to connect areas where a screen is displayed. According to various embodiments of the present disclosure, the tucked unit 150 may be configured without the groove 151. For example, the tucked unit 150 may be configured with different thicknesses or materials to allow the display 110 to be folded and disposed toward or entered in the bottom direction.

The operation module 170 may, for example, include software and hardware for performing a function of the electronic device 100 and may include configurable processing circuitry. The operation module 170, for example, may include a processor, a battery, a memory, and/or a communication module comprising communication circuitry. According to an embodiment of the present disclosure, the operation module 170 may be configured in a predetermined area (e.g., a bottom area) of the display 110. The operation module 170 may be configured to be disposed in an area adjacent to the tucked unit 150 and may be configured in a form connected to the tucked unit 150.

FIG. 1B is a side view illustrating the example electronic device 100 when unfolded (or, untucked). As illustrated in the drawing, in relation to the electronic device 100, the plurality of grooves 151 and the plurality of magnetic portions comprising magnetic materials 153 may, for example, be disposed in a predetermined bottom area of the display 110. The groove 151 and the magnetic material 153 may be configured to enable the electronic device 100 to be deformed easily and quickly. For example, when a pressure of more than a predetermined amount is applied, the form of the electronic device 100 may be changed. For example, the groove 151 may induce the tucked direction of a tucked area to be the bottom direction of the display 110 and the magnetic material 153 may perform a function for connecting untucked areas.

As mentioned above, the electronic device 100 may be easily deformed in a form in which the entire device is unfolded (for example, FIG. 1A and FIG. 1B) and a form (for example, FIG. 1C) in which a predetermined area is tucked (for example, a band or a watch). As illustrated in FIG. 1C, when a predetermined area of the electronic device 100 is tucked, the tucked areas may, for example, be curved in the bottom direction of the display 110 (or a wave form). For example, since there is a cushioning effect due to a curved form, the fit may be improved and ventilation effect may be obtained due to a space between the curved forms. According to various embodiments of the present disclosure, as illustrated in FIG. 1C, the electronic device 100 may, for example, be deformed into a band form in which areas induced to be tucked are all tucked, or only some areas among the induced areas may be tucked. For example, the electronic device 100 may be deformed into a band form having a relatively large diameter.

Figure 2A:
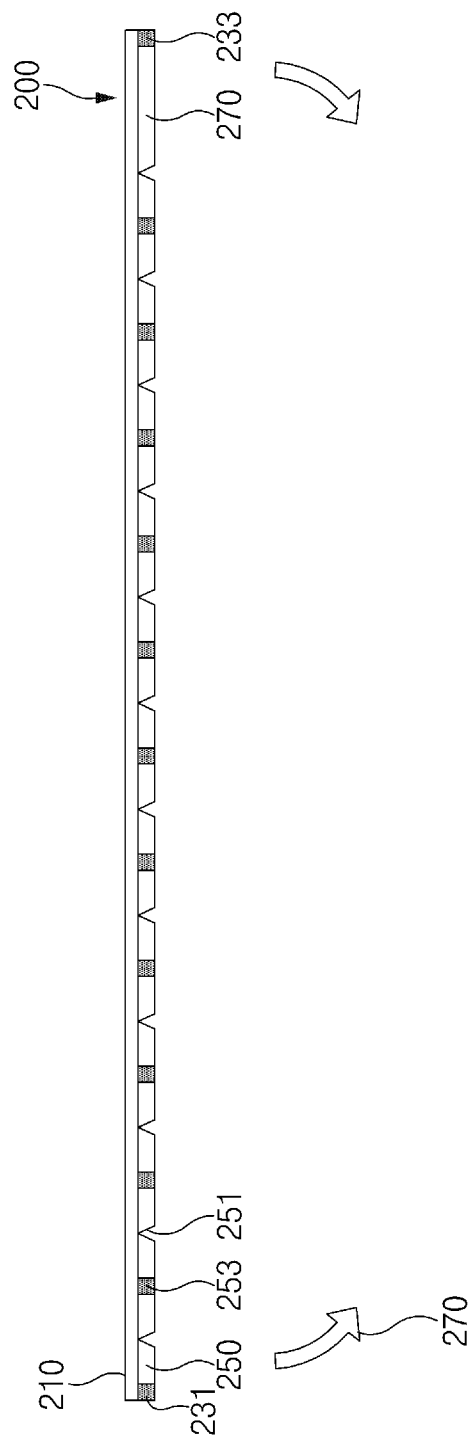
FIG. 2A is a side view illustrating a deformable wearable electronic device corresponding to a deformation of a wearable electronic device through a tucked unit according to various embodiments of the present disclosure.
Figure 2B:
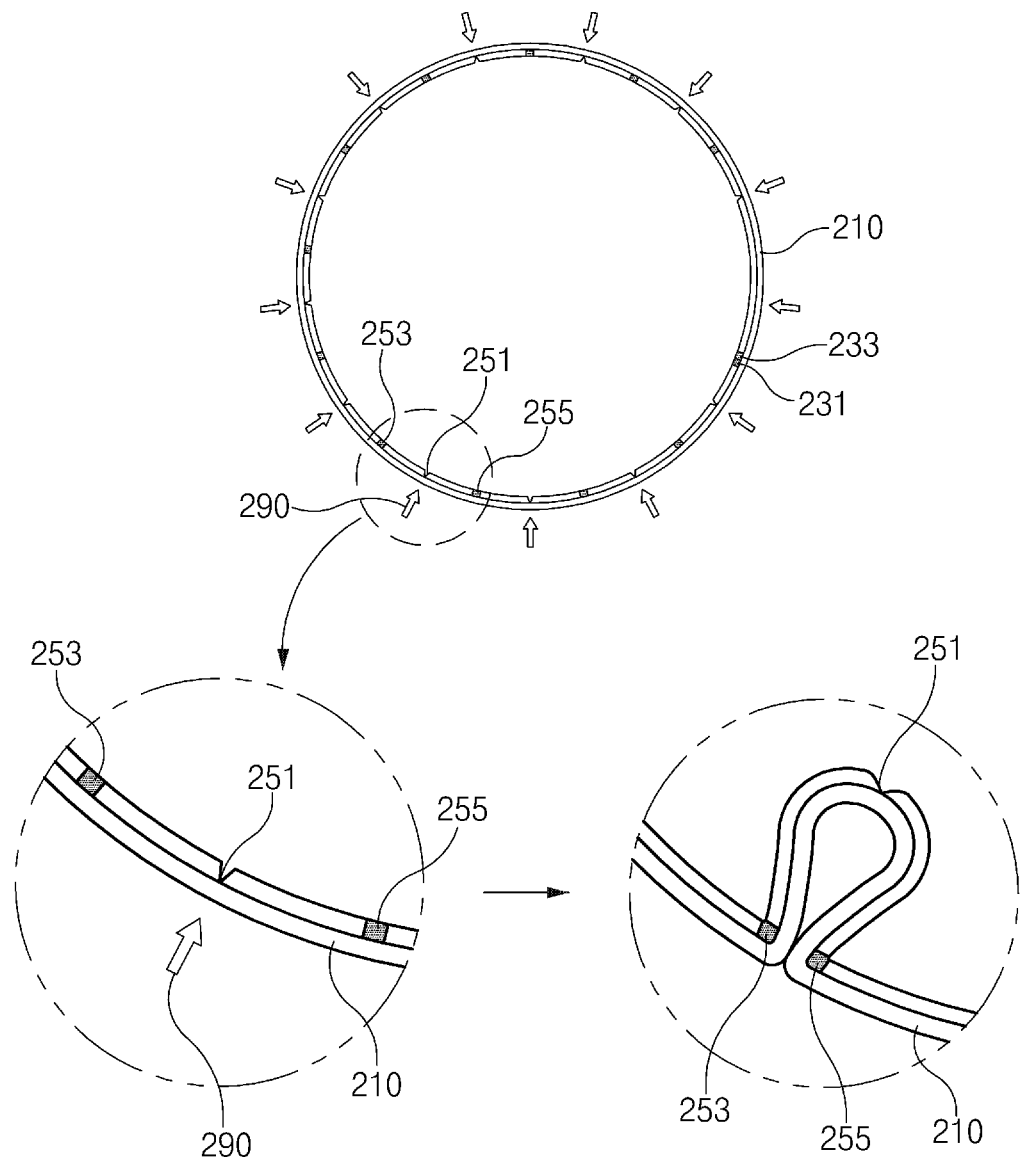
FIG. 2B is a side view illustrating a deformable wearable electronic device when both sides of a block are coupled according to various embodiments of the present disclosure.

FIG. 2A is a side view illustrating a deformable wearable electronic device corresponding to a deformation of a wearable electronic device through a tucked unit according to various embodiments of the present disclosure. FIG. 2B is a side view illustrating a deformable wearable electronic device when both ends are coupled according to various embodiments of the present disclosure. In the description below, content identical, similar, or corresponding to the above-mentioned content may be omitted.

As illustrated in FIG. 2A, in relation to an unfolded electronic device 200, connection units (e.g., connectors) 231, 233 disposed at both ends may be coupled to each other through an operation module 270 for bending the both ends. Once the connection units are coupled to each other, as illustrated in the upper drawing illustrated in FIG. 2B, as bent in the bottom direction of the display 210, the electronic device 200 may be deformed into a strip form where the first connection unit 231 and the second connection unit 233 are coupled (for example, a ring form, a bracelet or anklet form, a belt form, an arm ring form, and a necklace form, or the like). The electronic device 200 in a strip form may have a form of inserted into or hung on a body part or various structures. However, such a form may not be a form fixed to a body part or various structures. The electronic device 200 may be required to be deformed to correspond to the thickness of a body part or various structures to be fixed.

As illustrated in FIG. 2B, when a pressure 290 of more than a predetermined amount is applied in a predetermined direction, the electronic device 200 may be deformed. For example, in relation to the electronic device 200, a predetermined area of the display 210 may be folded and entered by the pressure 290 in the bottom direction of the display 210 based on a point where the pressure 290 is applied. For example, a predetermined area of the display 210 may be induced to be folded more easily and quickly by the groove 251. As illustrated in the drawing, in relation to the electronic device 200, an area connecting the groove 251 and points adjacent to the first magnetic material 253 and the second magnetic material 255 may be folded and disposed or entered in the bottom direction of the display 210 based on a predetermined area, for example, the groove 251. Additionally, the first magnetic material 253 and the second magnetic material 255 may be magnetically connected to each other after folding or deformation.

According to various embodiments of the present disclosure, the electronic device 200 may be deformed easily and quickly from a band form into an unfolded form. For example, the first magnetic material 253 and the second magnetic material 255 may be separated from each other by a force greater than a predetermined size in a predetermined direction. Additionally, the first connection unit 231 and the second connection unit 233 may be also separated from each other by a force greater than a predetermined size in a predetermined direction. According to an embodiment of the present disclosure, the electronic device 200 may be deformed into an unfolded form through an operation for holding both edges (for example, a point adjacent to a connection unit) of the electronic device 200 and pulling them by a force of a predetermined size in both directions.

According to various embodiments of the present disclosure, a deformation of the electronic device 200 may be a partially folded or unfolded form in addition to the entire unfolded form and a band form. For example, even when the groove 251 and the first magnetic material 253 in the tucked unit 250 are disposed in a predetermined bottom area of the display 210, they may not be tucked if a force of more than a predetermined size is not applied. If the display 210 is described with conceptually divided blocks (for example, Block 1, Block 2, . . . Block N in FIG. 1A), only Block 2 may be folded and entered by applying a force of a predetermined size to only Block 2. For example, when a force of more than a predetermined size is applied to areas that are required to be tucked, blocks corresponding to the areas may be tucked.

According to various embodiments of the present disclosure, the form of the electronic device 200 may be deformed manually by a force of a user but may be deformed automatically through an operation of the electronic device 200. For example, when a physical button disposed in a predetermined area of the electronic device 200 is selected, the electronic device 200 may be deformed. Additionally, when a virtual button displayed on the display 210 is selected, the electronic device 210 may be deformed. It will be understood that the form of the electronic device 200 may be deformed automatically through various methods.

Figure 3A:
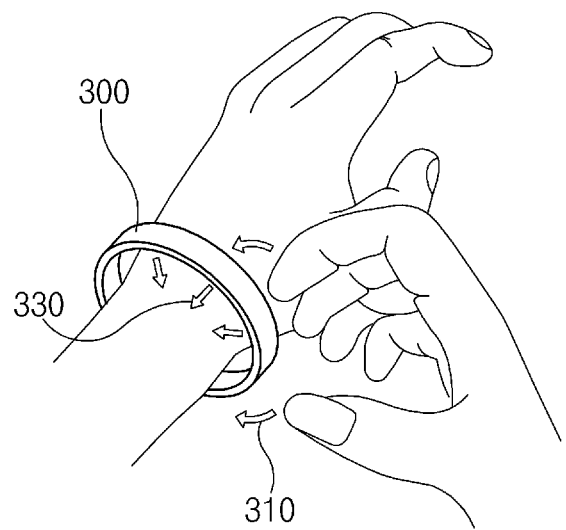
FIG. 3A is a view illustrating wearing state of a wearable electronic device according to various embodiments of the present disclosure.
Figure 3B:
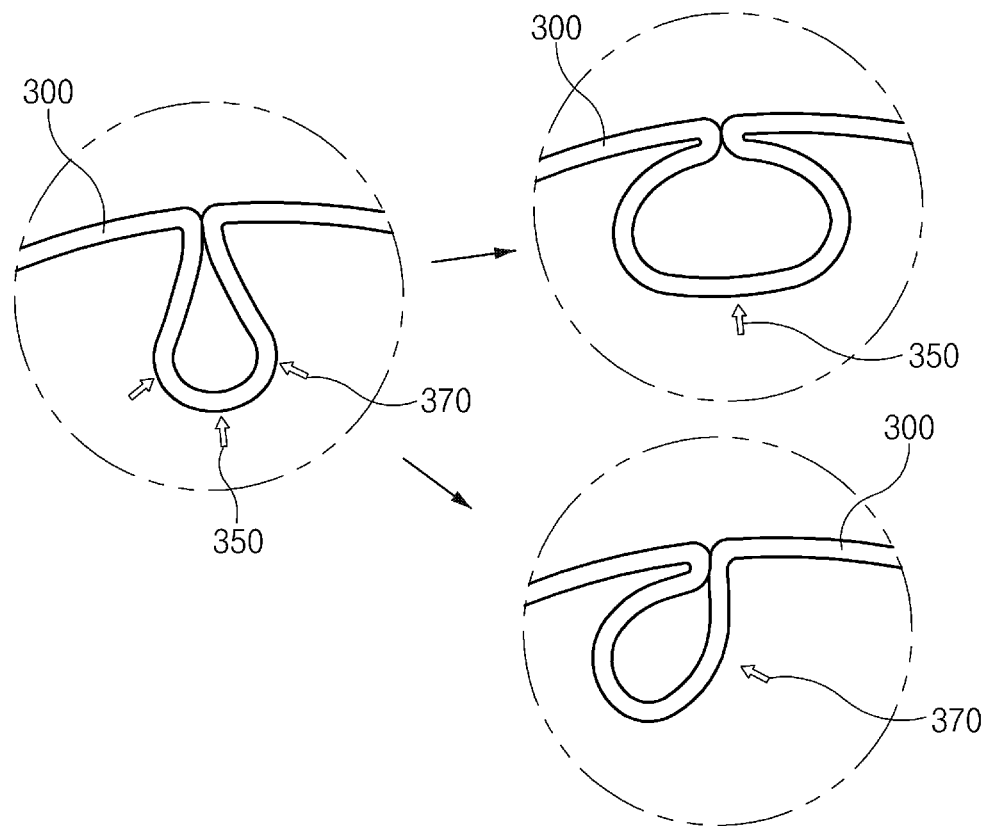
FIG. 3B is a view illustrating characteristics in a tucked area of a wearable electronic device deformed in a band form according to various embodiments of the present disclosure.

FIG. 3A is a view illustrating wearing state of a wearable electronic device according to various embodiments of the present disclosure. FIG. 3B is a view illustrating characteristics in a tucked area of a wearable electronic device deformed in a band form according to various embodiments of the present disclosure.

Referring to FIG. 3A, as described with reference to FIG. 2, an electronic device 300 may have a strip form in which connection units (e.g., connectors) are connected to each other by bending the both ends. The electronic device 300 in such a strip form, as illustrated in the drawing, may be put on a body part (for example, a wrist). However, since the electronic device 300 in a strip form is not fixed to a body part, while the body part moves, the electronic device 200 may rotate in an undesired direction. Accordingly, the electronic device 300 in a circle or band form may be deformed to be substantially conformed or fitted to a body part or various structures. For example, an operation 310 (for example, grabbing the electronic device 300) may be performed to apply a pressure 330 of more than a predetermined size to the electronic device 300 in a predetermined direction. When a pressure 330 is applied to the electronic device 300 in a strip form, as illustrated in FIG. 3B, the electronic device 300 may be deformed to allow a predetermined area to be tucked and have a curved form. The tucked area may serve as to conform or fit the electronic device 300 to a body part or various structures.

Referring to FIG. 3B, the tucked area of the electronic device 300 may have a cushioning effect due to the curved form, and thus the fit may be improved. For example, since the electronic device 300 uses a flexible display, the tucked area may be easily deformed. Accordingly, as illustrated in the drawing, when pressure is applied to a specific area (for example, a pressure 350 in a vertical direction or a pressure 370 in a diagonal direction), for example, to the tucked area, the tucked area may be pressed or moved in the acting direction of the pressure. For example, when the electronic device 300 is worn on a wrist in a band form, as a vertical pressure 350 or a diagonal pressure 370 is applied, the tucked area may be pressed or tilted to the side based on, for example, the thickness of the wrist. When the tucked area is pressed or tilted to the side, the fit of the electronic device 300 may be improved. Additionally, as long as the thickness of a fixed object (for example, a wrist) does not exceed a predetermined size, such a phenomenon may allow the electronic device 300 to be worn on the object.

According to various embodiments of the present disclosure, in relation to the tucked area of the electronic device 300, the area of a surface contacting a user's body part (for example, a wrist) may vary based on information such as the current temperature and a user's heart rate. For example, the area of the contacting surface may be relatively narrow when the current temperature is higher than a specified temperature and may be relatively broad when the current temperature is lower than the specified temperature.

Figure 4A:
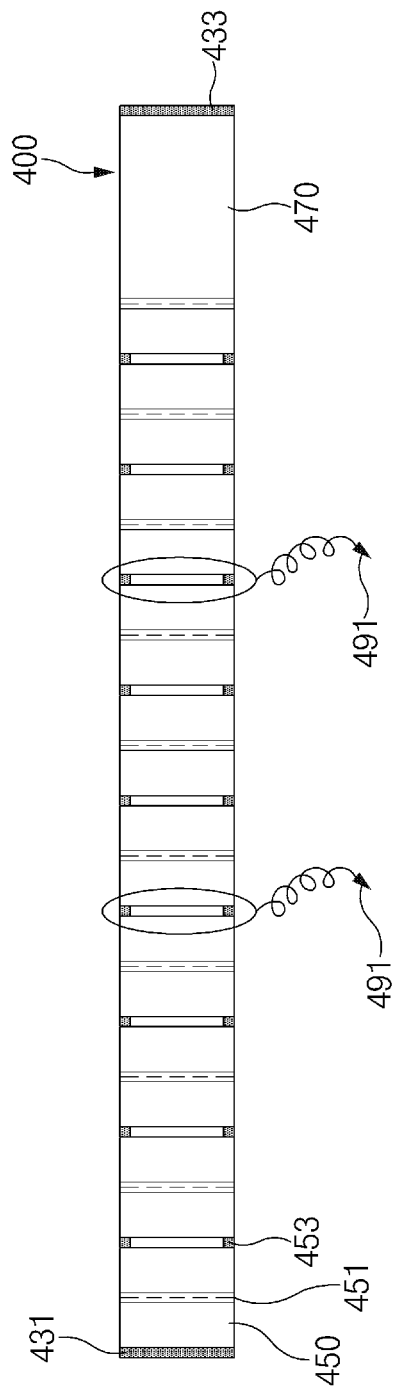
FIG. 4A is a bottom view illustrating a wearable electronic device according to various embodiments of the present disclosure.
Figure 4B:
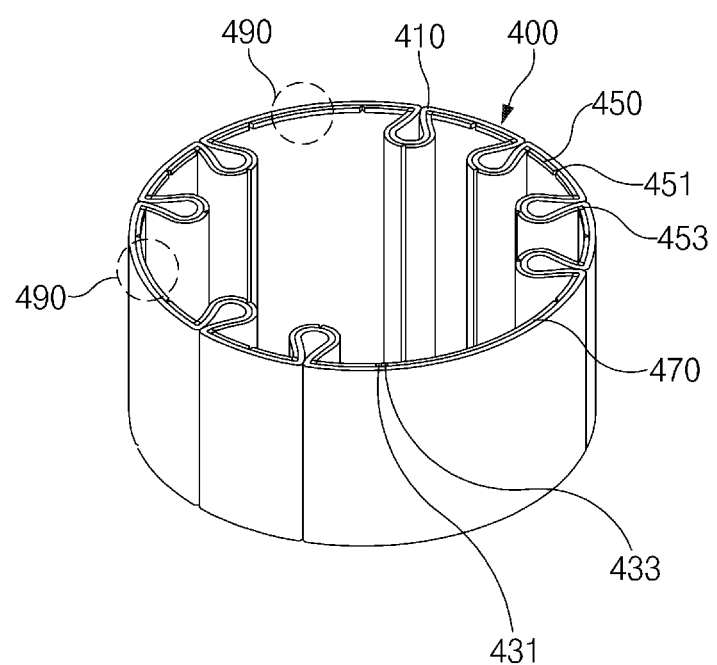
FIG. 4B is a view illustrating various deformations of a wearable electronic device through a configuration change of a tucked portion according to various embodiments of the present disclosure.

FIG. 4A is a bottom view illustrating a wearable electronic device according to various embodiments of the present disclosure. FIG. 4B is a view illustrating various deformations of a wearable electronic device through a configuration change of a tucked unit according to various embodiments of the present disclosure.

FIG. 4A is a bottom view of an electronic device 400. In wearing the electronic device 400, if the thickness of a fixed object exceeds a specified size, even if a cushioning effect is provided, wearing may be impossible. For example, if the diameter of the electronic device 400 in a band form is smaller than the thickness of a fixed object, wearing the device properly is impossible.

Referring to FIG. 4A, in order to solve the above-mentioned issues, the electronic device 400 may be configured to enable a change in the placement of at least one of a groove 451 and a magnetic material 453 in a tucked unit 450. The drawing illustrates an operation 491 for removing the magnetic material 453 disposed at a specific position. According to various embodiments of the present disclosure, the magnetic material 453 may be removed arbitrarily or its placement may be changed. Additionally, the groove 451 may be filled arbitrarily. By filling the groove 451 arbitrarily or changing the position of the magnetic material 453, the tucked area of the electronic device 400 may be changed.

The electronic device 400 may also include components discussed above, such as, for example, connectors/connecting units 431, 433, and operation module 470.

Referring to FIG. 4B, as mentioned above, the magnetic material 453 disposed at a specific position is removed and the groove 451 adjacent thereto may be filled through an operation 491. For example, when the electronic device 400 is deformed into a band form, as shown in an area 490, an existing tucked area may not be tucked. In such a way, as the tucked area is not tucked, the diameter of the electronic device 400 in a band form may be increased. Additionally, as the diameter is increased, the effective thickness limits of a wearable fixed object may be increased.

According to various embodiments of the present disclosure, as illustrated in FIG. 4A, the magnetic material 453 having a predetermined volume may be disposed at a predetermined interval on the both sides of the electronic device 400 and a specific surface may be exposed to the outside. Additionally, the magnetic material 453 may be divided into two and disposed at both sides of the electronic device 400, respectively. According to various embodiments of the present disclosure, the magnetic material 453 may be disposed in one long cylindrical form or a rectangular form instead of being divided into two and disposed at both sides of the electronic device 400, respectively. When the magnetic material 453 may be disposed in one long cylindrical form or a rectangular form, this may have a connection effect with a more powerful magnetism. Additionally, the magnetic material 453 may be disposed inside the tucked unit 450 so as not to be exposed to the outside instead of being displayed exposed to the outside of the tucked unit 450. For example, the tucked unit 450 may be configured in a form of covering a plurality of magnetic materials 453 disposed in a predetermined display bottom area of the electronic device 400. Additionally, the tucked unit 450 may be provided in a form of detachable to a predetermined display bottom area.

As mentioned above, according to various embodiments of the present disclosure, a wearable electronic device may include: a flexible display divided into a plurality of blocks; at least one block configured to be folded or tucked; and at least one magnetic material disposed at both sides of the at least one block configured to be folded or tucked among the plurality of blocks, the magnetic material configured to connect unfolded (or, untucked) blocks each other among the plurality of blocks by connecting both sides of the at least one folded block.

According to various embodiments of the present disclosure, the electronic device may further include at least one of: at least one groove disposed in a predetermined area (e.g., a bottom area) of the display and configured to enable at least one block among the plurality of blocks to be folded in a bottom direction of the display; and a connector disposed at each end of the display and configured to couple both ends of the display.

According to various embodiments of the present disclosure, the electronic device may further include at least one sensor disposed in a predetermined bottom area of the display and configured to sense whether the display is tucked or folded.

According to various embodiments of the present disclosure, the sensor may be a proximity sensor and may be disposed in an area adjacent to the magnetic material.

According to various embodiments of the present disclosure, the sensor may be a flexible bend sensor.

According to various embodiments of the present disclosure, the electronic device may further include an operation module configured to control the electronic device not to display a screen of the at least one folded block when the display is tucked.

According to various embodiments of the present disclosure, the electronic device may further include an operation module configured to control the electronic device not to display a screen of at least one block whose angle formed by a normal direction of a screen and a viewing direction is out of a specified angle range among the plurality of blocks.

According to various embodiments of the present disclosure, the electronic device may further include an operation module configured to control the electronic device to change a screen output state of at least one block selected by an input from among the plurality of blocks.

According to various embodiments of the present disclosure, the input may include at least one of touch, gesture, approach, hovering, and voice input.

According to various embodiments of the present disclosure, the operation module may be configured to output a list of applications installed in the electronic device when the screen output state is changed from a turn-off state into a turn-on state.

According to various embodiments of the present disclosure, the operation module may be configured to output an execution screen of an application selected from the list of applications.

According to various embodiments of the present disclosure, the electronic device may further include, when different application execution screens are respectively outputted to the plurality of blocks or an execution screen of a specific application is outputted to a specific block from among the plurality of blocks, an operation module configured to output information relating to the specific application to at least one block adjacent to the specific block.

Figure 5A:
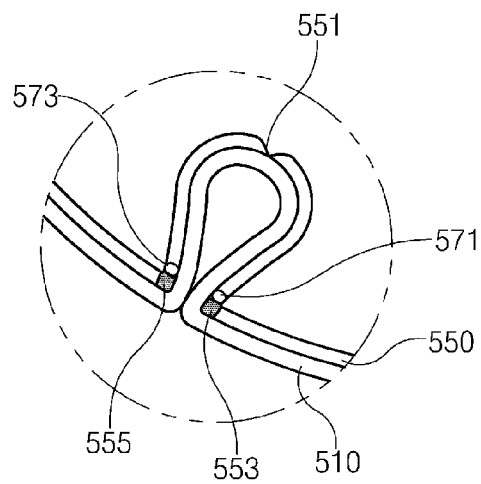
FIG. 5A is a view illustrating a method of determining a display of a tucked area based on a sensor among display area setting methods of a display according to various embodiments of the present disclosure.
Figure 5B:
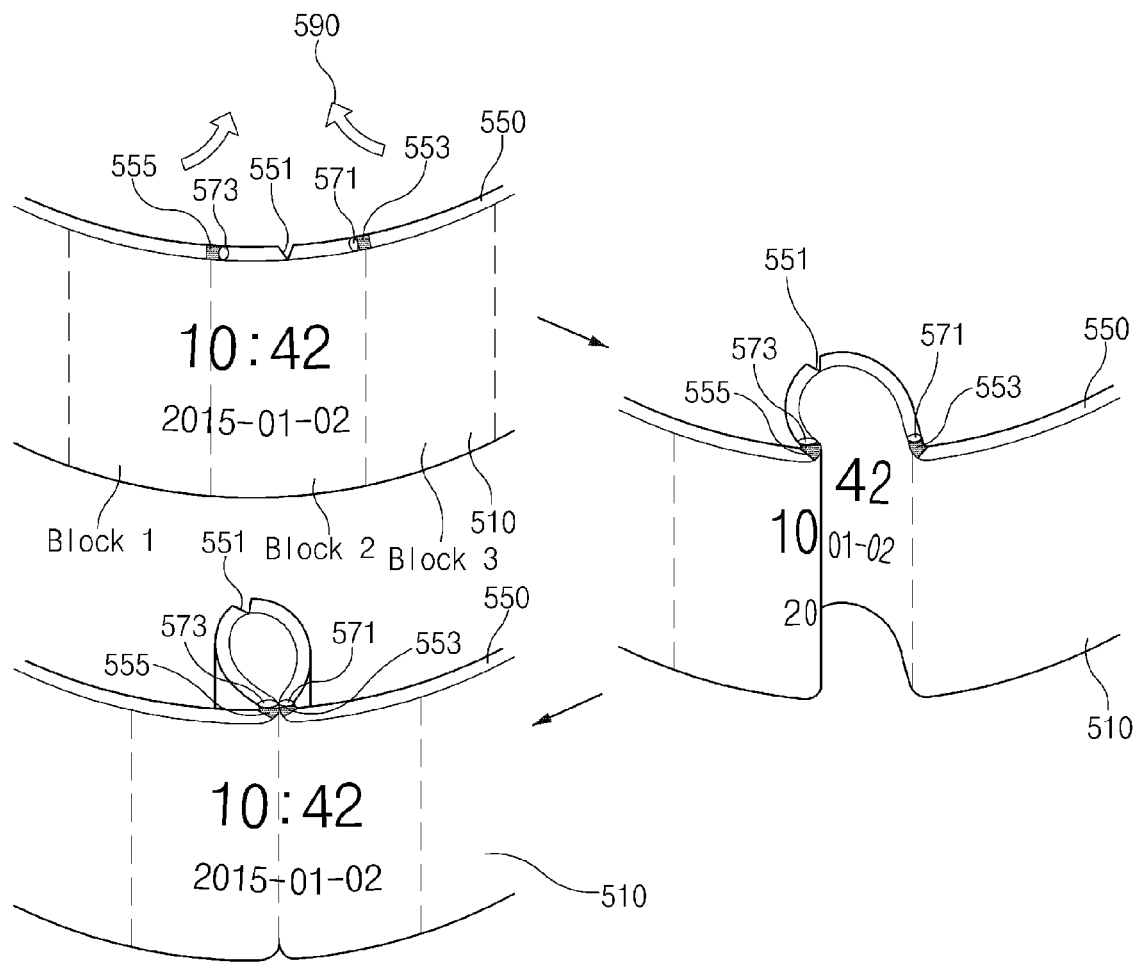
FIG. 5B is a view illustrating changing a display area of the display while a wearable electronic device is tucked according to various embodiments of the present disclosure.

FIG. 5A is a view illustrating a method of determining a display of a tucked area based on a sensor among display area setting methods of a display according to various embodiments of the present disclosure. FIG. 5B is a view illustrating changing a display area of the display while a wearable electronic device is tucked.

Referring to FIG. 5A, when an electronic device is tucked in a band form, a predetermined area of a display 510 may be folded and disposed toward or entered in the bottom direction of the display 510 based on a groove 551. For example, the electronic device may be deformed easily and quickly through the groove 551 and magnetic materials (for example, a first magnetic material 553 and a second magnetic material 555) included in a tucked unit 550 in a predetermined bottom area of the display 510. For example, in relation to the display 510, due to a thickness difference, an area including the groove 551 may be easily folded in comparison to another area that does not include a groove. Accordingly, when a pressure of more than a predetermined size is applied in a predetermined direction, an area including the groove 551 may be folded and disposed toward or entered in the bottom direction of the display. Additionally, the first magnetic material 553 and the second magnetic material 555 disposed at predetermined points at both ends of a tucked area may be connected magnetically in order to connect untucked areas.

According to various embodiments of the present disclosure, an electronic device may include a sensor disposed in a predetermined area (for example, an area adjacent to a magnetic material) of the tucked unit 550 in order to determine a tucked area. For example, the sensor may be a proximity sensor. The proximity sensor may, for example, be a sensor for detecting whether there is an object approaching a predetermined detection surface or an object in the vicinity. The proximity sensor may be configured with an inductive type, a capacitive type, an ultrasonic type, a photoelectric type, and a magnetic type, or the like. For example, when the sensor is a photoelectric type proximity sensor, a light emitting diode and a photo diode may be disposed in a predetermined area of the tucked unit 550.

FIG. 5B illustrates a form in which the sensor is divided into a sensing unit 571 and a detection target unit 573 and disposed adjacent respective magnetic materials 553, 555. For example, when the sensor is a photoelectric type proximity sensor, the sensing unit 571 may be a photo diode and the detection target unit 573 may be a light emitting diode. Alternatively, when the sensor is a capacitive type proximity sensor, each of the sensing unit 571 and the detection target unit 573 may be one flat plate.

According to various embodiments of the present disclosure, the sensor may be a flexible bend sensor. The flexible bend sensor, as a sensor bent in itself, may detect a resistance value that is changed in proportion to the bending degree. The flexible bend sensor may have a thin strip form and may be attached to a predetermined bottom area of the display 510.

Although it is illustrated in the drawing that the sensing unit 571 is disposed in an area adjacent to the first magnetic material 553 and the detection target unit 573 is disposed in an area adjacent to the second magnetic material 555, based on the types or characteristics of the sensing unit 571 and the detection target unit 573, their arranged positions may vary. According to various embodiments of the present disclosure, the sensor 571 may be the sensor and the detection target unit 573 may not be included.

Referring to FIG. 5B, a display area of the display 510 may be changed when the electronic device is tucked. For example, when an area of the display 510 is divided into Block 1, Block 2, and Block 3, a force 590 of more than a predetermined amount may be applied to the electronic device in a predetermined direction. For example, since an area including the groove 551 is easily folded in comparison to another area, Block 2 where the groove 551 is disposed may be folded and entered. Additionally, as the first magnetic material 553 and the second magnetic material 555 disposed at both edges of Block 2 are connected to each other magnetically, the screen of Block 2 folded and entered in the bottom direction of the display 510 becomes unseen and Block 1 and Block 3 may be connected to each other.

According to various embodiments of the present disclosure, whether Block 1 and Block 3 are connected may be determined through a sensor 571, 573 disposed in a predetermined area of the tucked unit 550. Additionally, when it is determined through a sensor that Block 2 is tucked as Block 1 and Block 3 are connected to each other, the area of Block 2 may be excluded from the display area of the display 510. For example, as illustrated in FIG. 5B, display objects may be disposed in predetermined areas of Block 1 and Block 2 before tucked. Additionally, when Block 2 is folded and entered by the force 590 and Block 1 and Block 3 are connected, the electronic device may exclude the area of Block 2 from the display area of the display 510. At this point, display objects displayed in a predetermined area of Block 2 may be displayed in predetermined areas of Block 1 and Block 3 through, for example, coordinate transformation.

According to various embodiments of the present disclosure, depending on a size ratio of a display area before the tucking of the display 510 and a display area after the tucking of the display 51, the coordinates or sizes of the display objects may be changed and displayed. For example, when the display area of the display 510 is changed from the areas of Block 1, Block 2, and Block 3 before tucking into the areas of Block 1 and Block 3 after tucking, the sizes of the display objects may be set to be small based on a reduced display area. Additionally, the coordinates of the display objects may be changed and displayed by the sizes of the display objects set to be small.

According to various embodiments of the present disclosure, when a predetermined area of the display 510 is tucked, the display 510 may terminate the output of the predetermined area or output information relating to display objects being displayed in an adjacent untucked area at the timing of starting the tucking. Additionally, when a tucked area is unfolded, the display 510 may output, to the tucked area, information relating to display objects displayed in an area adjacent to the tucked area. For example, Block 2 is tucked so that Block 1 and Block 3 may be connected to each other. Additionally, the display 510 may output pictures to Block 1 and Block 3. For example, when Block 1 and Block 3 are spaced a predetermined distance from each other and thus a predetermined portion of Block 2 is seen by eyes, the display 510 may display, in a predetermined portion of Block 2, information relating to pictures outputted to Block 1 and Block 3, for example, details of pictures.

As mentioned above, the electronic device may determine a tucked area, that is, an area of a display where a screen is unseen as folded and entered in the bottom direction of the display. Additionally, as the electronic device excludes a tucked area from a display area, current consumption for an unnecessary area may be prevented.

Figure 6A:
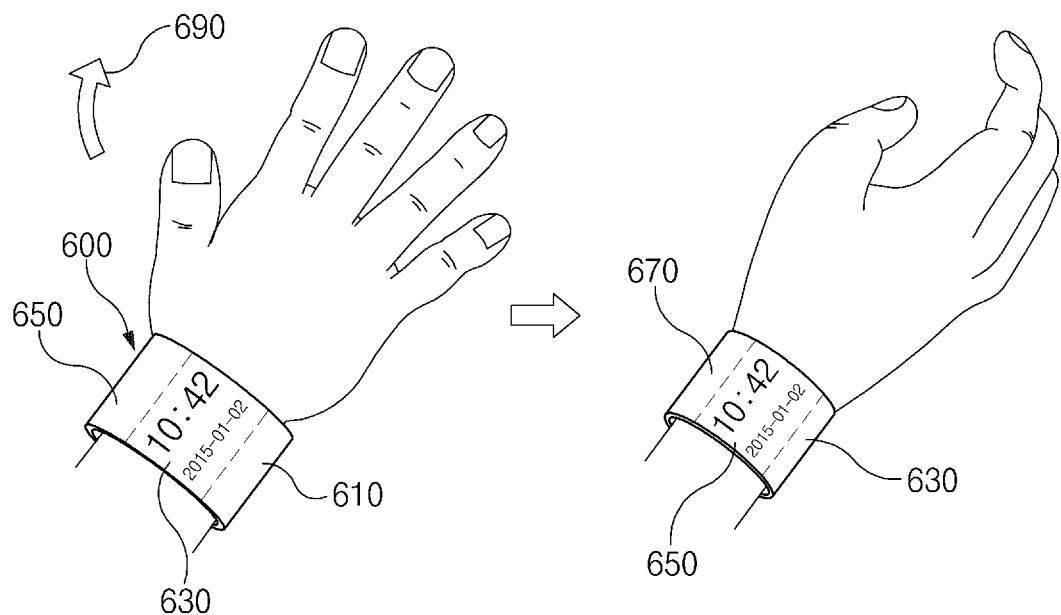
FIG. 6A is a view illustrating a sensor based setting method among display area setting methods of a display according to various embodiments of the present disclosure.
Figure 6B:
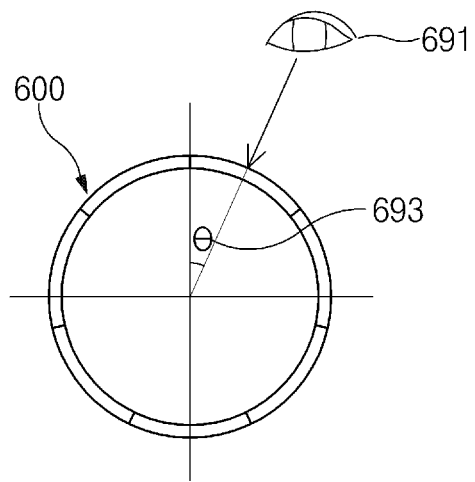
FIG. 6B is a view illustrating determining a display area on the basis of an angle formed by the viewing direction and the normal direction of a display screen of a wearable electronic device according to various embodiments of the present disclosure.

FIG. 6A is a view illustrating a sensor based method for setting a display area of a display according to various embodiments of the present disclosure. FIG. 6B is a view illustrating determining a display area on the basis of an angle formed by the viewing direction and the normal direction of a display screen of a wearable electronic device according to various embodiments of the present disclosure.

As an electronic device 600 excludes a tucked area, which is determined through a sensor, from a display area of a display, unnecessary current consumption may be prevented and/or reduced. However, when the electronic device 600 is worn on a body part (for example, a wrist) according to characteristics of the electronic device 600 in a band form, a screen that a user can see directly is limited. For example, as the back of a user's hand faces up and corresponds to a viewing direction, the screen of a display where the normal direction of the screen is disposed within a predetermined angle range on the basis of the direction of the back of the hand may be seen by the eyes but other display screens may not be seen by the eyes. Accordingly, current consumption for display areas, which are difficult for the eyes to see directly, may be unnecessary.

Referring to FIG. 6A, the electronic device 600 may be configured to determine an area of a display, which is hardly seen or difficult to see by the eyes directly, based on a sensor and to exclude a corresponding area from the display area. The left drawing in the drawing of FIG. 6A illustrates a case that the back of a hand faces up and corresponds to a viewing direction. In this case, a first area 610 (or Block 1) and a third area 650 (or Block 3) are excluded from the display area of the display and only a second area 630 (or Block 2) may be set as the display area of the display.

According to various embodiments of the present disclosure, when the position or direction of the electronic device 600 is changed, the display area of the display may be changed correspondingly. For example, as shown in the right drawing in FIG. 6A, when the back of a hand faces up and corresponds to a viewing direction through an operation 690 for rotating the hand, the display area of a display may be changed from the second area 630 into the third area 650.

According to various embodiments of the present disclosure, when the entire divided areas are seen by the eyes directly (for example, the third area 650), the electronic device 600 may set the entire divided areas as a display area. Additionally, if only some divided areas are seen by the eyes directly (for example, the second area 630 or the fourth area 670), the electronic device 600 may set a portion of a corresponding area as a display area.

Referring to FIG. 6B, the electronic device 600 may be configured to determine an area seen by the eyes directly on the basis of an angle (θ) 693 formed by the user's eyes 691 and the normal direction of a display screen. Additionally, the electronic device 600 may set an area that is seen by the eyes directly as the display area of a display. According to an embodiment of the present disclosure, if the angle 693 is included in a predetermined angle range, the electronic device 600 may set a corresponding area as a display area. According to various embodiments of the present disclosure, the electronic device 600 may, for example, determine the angle 693 on the basis of sensor information collected through a sensor. The electronic device 600 may receive a viewing direction from a user. Additionally, the electronic device 600 may collect sensor information such as the position, direction or inclination of the electronic device 600 from the sensor. The electronic device 600 may be configured to determine the angle 693 using a viewing direction and the sensor information. The sensor, for example, may include a gyro sensor, an acceleration sensor, or a tilt sensor, or the like.

Figure 7A:
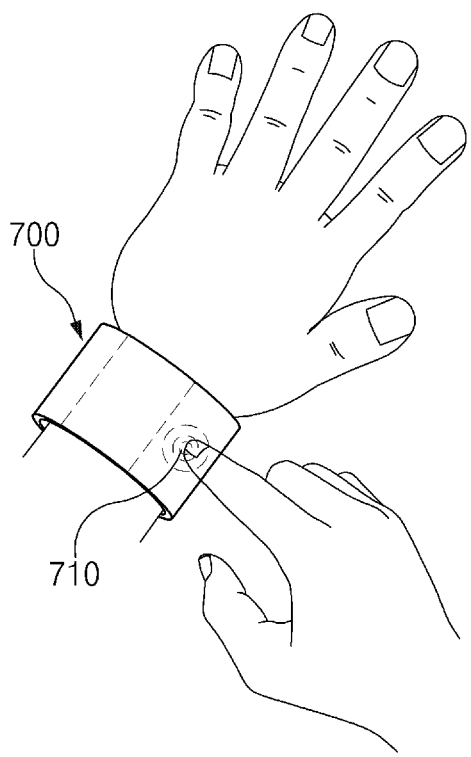
FIG. 7A is a view illustrating an input using touch tapping based setting method among display area setting methods of a display according to various embodiments of the present disclosure.
Figure 7B:
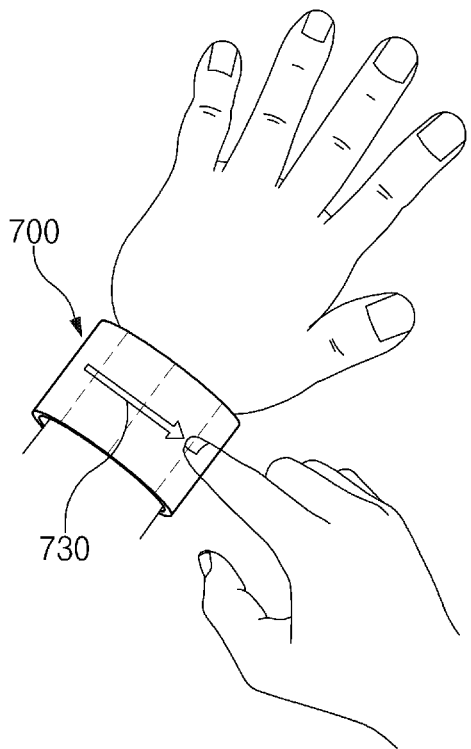
FIG. 7B is a view illustrating an input using touch swipe based setting method among display area setting methods of a display according to various embodiments of the present disclosure.

FIG. 7A is a view illustrating an input using touch tapping based setting method among display area setting methods of a display according to various embodiments of the present disclosure. FIG. 7B is a view illustrating an input using touch swipe based setting method among display area setting methods of a display according to various embodiments of the present disclosure.

Referring to FIG. 7A and FIG. 7B, an electronic device 700 may be configured to set a display area of a display on the basis of an input, e.g., a user input. According to an embodiment of the present disclosure, in relation to the electronic device 700, as shown in FIG. 7A, a display area of a display may be set through an operation 710 for touch tapping a predetermined point of the display. For example, the electronic device 700 may divide a display into a plurality of blocks. At this point, when a certain block point is touched, the electronic device 700 may set a corresponding block as a display area. According to various embodiments of the present disclosure, a block set as a display area may be at least one. Additionally, when a block set as a display area is touched again, the electronic device 700 may exclude a corresponding block from the display area. For example, the electronic device 700 may be configured to determine whether to set display areas of blocks according to a touch operation.

According to various embodiments of the present disclosure, as illustrated in FIG. 7B, a predetermined area of a display may be set as a display area through a touch swipe operation 730. According to an embodiment of the present disclosure, the electronic device 700 may be configured to set all blocks contacted by a touch object (for example, a finger) as a display area of a display through the touch swipe operation 730. For example, when a user swipes from Block 1 to Block 3 by a finger, the electronic device 700 may set areas from Block 1 to Block 3 as a display area. According to various embodiments of the present disclosure, when a user selects a predetermined display area as if drawing a closed curve, the electronic device 700 may set a predetermined area of a display corresponding to the inside of the closed curve as a display area.

According to various embodiments of the present disclosure, the electronic device 700 may be configured to set a display area based on a usage pattern and screen readability. For example, when a user wears the electronic device 700 in a band form by a wrist, the electronic device 700 may be configured to collect angle information formed by a display and user's eyes such as a wearing form and a wrist angle. Additionally, when a user wears the electronic device 700 in a band form by a wrist by analyzing the collected information, the electronic device 700 may be configured to determine a specific area of a display having an excellent screen readability. For example, the electronic device 700 may set the specific area as a display area without selection by a touch operation.

As mentioned above, an electronic device may be configured to set a display area on the basis of at least one of a sensor and a user input. For example, an electronic device may exclude at least one of an area that is tucked due to a deformation of the electronic device and where a screen is unseen, an area that is not seen directly by the user's eyes, and an area that a user does not select for display, from a display area of a display. Excluding an unnecessary area from a display area may cause an effect for preventing and/or reducing unnecessary current consumption. Additionally, in relation to an electronic device where battery shortage occurs frequently such as a wearable electronic device, excluding an unnecessary area from a display area of a display is advantageous.

Figure 8:
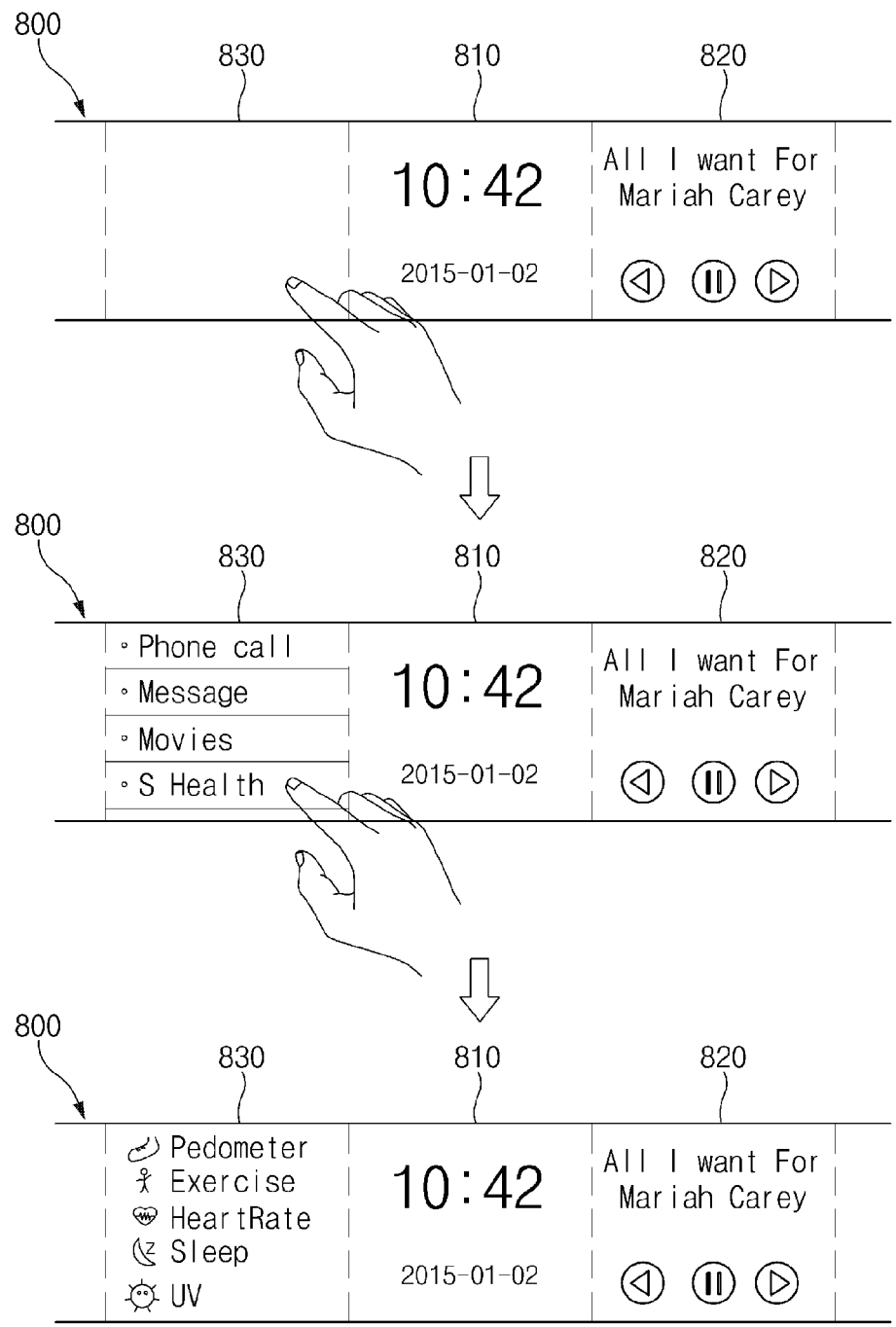
FIG. 8 is a view illustrating a method of setting a display function depending on a display area of a display according to various embodiments of the present disclosure.

FIG. 8 is a view illustrating a method of setting a display function depending on a display area of a display according to various embodiments of the present disclosure.

Referring to FIG. 8, an electronic device 800 may be configured to set a display function based on a display area of a display. For example, the electronic device 800 may be configured to output a first area 810, a second area 820, and a third area 830 to different screens. According to an embodiment of the present disclosure, the electronic device 800 may be configured to set an application that occupies a display area based on a display area of a display. For example, an execution screen of a first application may be outputted to the first area 810 and an execution screen of a second application may be outputted to a second area 820. In such a way, a plurality of applications may be divided into a plurality of display areas to occupy a screen of a display. According to various embodiments of the present disclosure, one application may occupy a plurality of display areas as a display screen.

As shown in the upper end drawing in FIG. 8, a watch application occupies the first area 810 to display, for example, the current time and the current data and a music playback application occupies the second area 820 to display, for example, information of a currently played music source and a control button object. Additionally, the third area 830 may be excluded from the display area of the display.

According to various embodiments of the present disclosure, when the third area 830, excluded from the display area of the display, is selected, the electronic device 800 may set the third area 830 as a display area. In this case, as illustrated in the middle drawing in FIG. 8, the electronic device 800 may be configured to output a menu screen inducing selection of an application that is to occupy the third area 830 set as a display area. The menu screen may, for example, include a list of available applications installed in the electronic device 800. According to various embodiments of the present disclosure, the menu screen may output a webpage collected from a specific server through a communication module of the electronic device 800.

When an application is selected through the menu screen, as illustrated in the bottom end drawing in FIG. 8, an execution screen of a corresponding application may be outputted to the third area 830. According to various embodiments of the present disclosure, the area may be excluded from the display area by touching a predetermined point of an arbitrary area (for example, the first area 810) set as a display area of a display.

According to various embodiments of the present disclosure, the electronic device 800 may be configured to output interrelated information to the first area 810, the second area 820, and the third area 830. For example, the electronic device 800 may be configured to output a main menu screen to the first area 810. Then, the electronic device 800 may be configured to output a sub menu screen to the second area 820 in correspondence to a selection of the main menu. Additionally, the electronic device 800 may be configured to output result information, for example, a second sub menu or an application execution screen, to the third area 830 corresponding to a selection of the sub menu.

According to various embodiments of the present disclosure, the electronic device 800 may be configured to output an application execution screen to the first area 810 and may be configured to output information relating to the application to the second area 820. Alternatively, the electronic device 800 may be configured to output, to the third area 830, information that immediately provides a notification to a user when an event occurs, for example, notification information such as incoming call, message reception, or alarm, or the like.

As mentioned above, when the entire electronic device is unfolded, a deformable wearable electronic device may improve the utilization with a large screen using the entire display and if tucked in a band form, may improve the portability by wearing the deformable wearable electronic device on a body part or various structures. Such a deformation of an electronic device may be provided through a tucked unit including a plurality of grooves and magnetic materials disposed in a predetermined bottom area of a display. Additionally, by setting a display area of a display on the basis of at least one of a sensor and an input, an necessary area, for example, at least one of an area that is tucked due to a deformation of an electronic device and where a screen is unseen, an area that is not seen directly by the user's eyes, and an area that a user does not select for display may be excluded from the display area of the display. Through this, the electronic device may prevent and/or reduce unnecessary current consumption.

According to various embodiments of the present disclosure, a method of setting a display area of a display of a wearable electronic device may include: determining whether blocks of a display divided into the plurality of blocks are tucked; and displaying information on at least one block except for a tucked block among the plurality of blocks.

According to various embodiments of the present disclosure, the determining may include making a determination based on at least one sensor disposed in a predetermined area of the display, e.g., a bottom area of the display.

According to various embodiments of the present disclosure, the displaying may include controlling the electronic device not to display a screen of at least one block from among the plurality of blocks whose angle formed by a normal direction of a screen and a viewing direction is out of a specified angle range.

According to various embodiments of the present disclosure, the method may further include changing a screen output state of at least one block from among the plurality of blocks selected by an input.

According to various embodiments of the present disclosure, the changing of the screen output state may include selecting at least one block from the plurality of blocks corresponding to a touch input.

According to various embodiments of the present disclosure, the method may further include outputting a list of applications installed in the electronic device when the screen output state is changed from a turn-off state into a turn-on state.

According to various embodiments of the present disclosure, the method may further include, when a specific item is selected from the list of applications, outputting an execution screen of an application corresponding to the selected item.

According to various embodiments of the present disclosure, the method may further include at least one of: respectively outputting different application execution screens to the plurality of blocks; and when outputting an execution screen of a specific application to a specific block from among the plurality of blocks, outputting information relating to the specific application to at least one block adjacent to the specific block.

Figure 9:
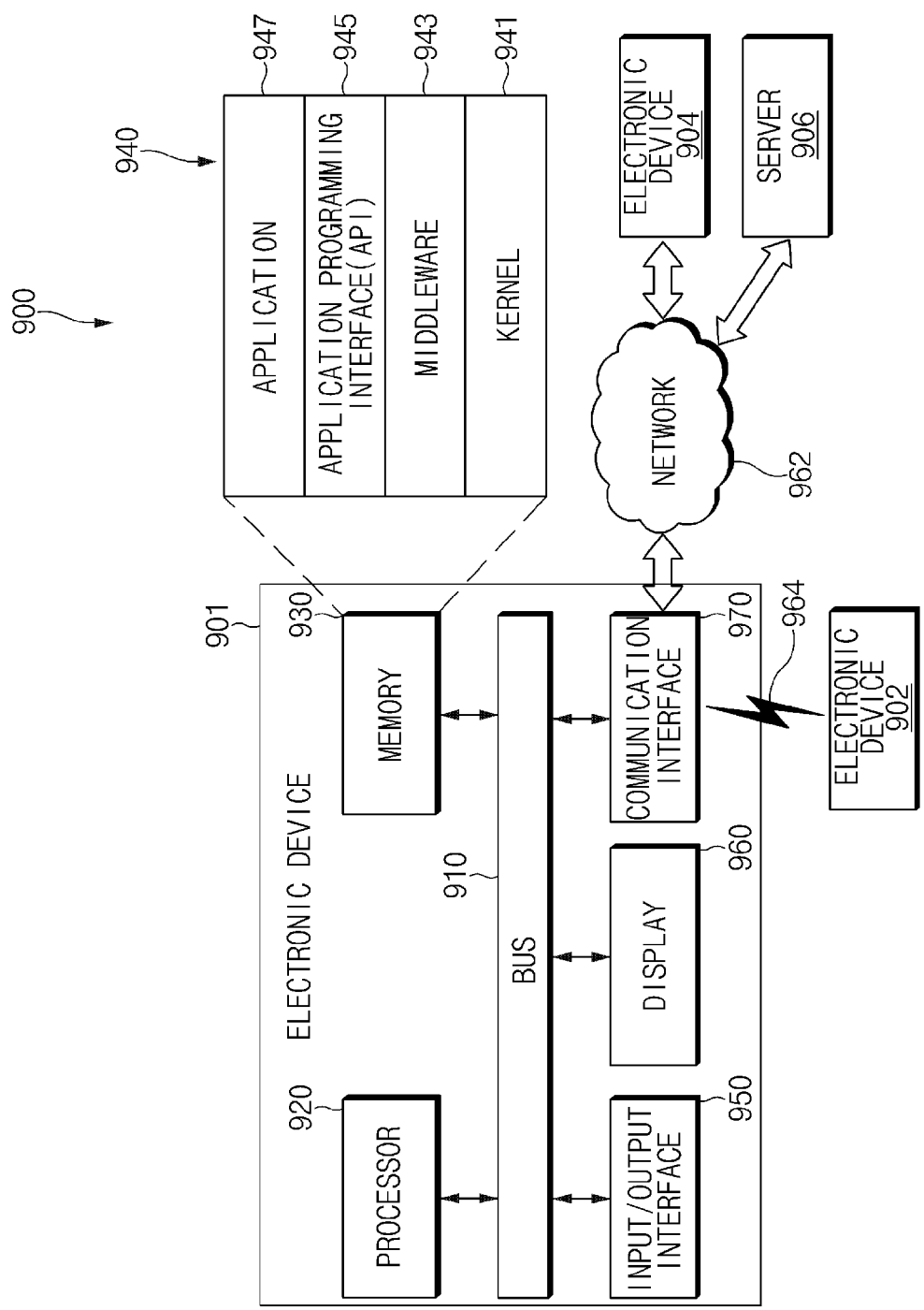
FIG. 9 is a view illustrating an electronic device in a network environment according to various embodiments of the present disclosure.

FIG. 9 is a view illustrating an electronic device in a network environment according to various embodiments of the present disclosure.

Referring to FIG. 9, an electronic device 901 in a network environment 900 is described according to various embodiments of the present disclosure. The electronic device 901 may include a bus 910, a processor 920, a memory 930, an input/output interface 950, a display 960, and a communication interface 970. According to an embodiment of the present disclosure, the electronic device 901 may omit at least one of the components or may additionally include a different component.

The bus 910, for example, may include a circuit for connecting the components 910 to 970 to each other and delivering a communication (for example, control message and/or data) therebetween.

The processor 920 may include at least one of a central processing unit (CPU), an Application Processor (AP), and a communication processor (CP). The processor 920, for example, may execute calculation or data processing for control and/or communication of at least one another component of the electronic device 901.

The memory 930 may include volatile and/or nonvolatile memory. The memory 930, for example, may store instructions or data relating to at least one another component of the electronic device 901. According to an embodiment of the present disclosure, the memory 930 may store software and/or programs 940. The programs 940 may include a kernel 941, a middleware 943, an application programming interface (API) 945, and/or an application program (or an application) 947. At least part of the kernel 941, the middleware 943, or the API 945 may be called an operating system (OS).

The kernel 941, for example, may control or manage system resources (for example, the bus 910, the processor 920, the memory 930, and so on) used for performing operations or functions implemented in other programs (for example, the middleware 943, the API 945, or the application program 947). Additionally, the kernel 941 may provide an interface for controlling or managing system resources by accessing an individual component of the electronic device 901 from the middleware 943, the API 945, or the application program 947.

The middleware 943, for example, may serve as an intermediary role for exchanging data as the API 945 or the application program 947 communicates with the kernel 941.

Additionally, the middleware 943 may process at least one job request received from the application program 947 based on a priority. For example, the middleware 943 may assign to at least one application program 947 a priority for using a system resource (for example, the bus 910, the processor 920, or the memory 930) of the electronic device 901. For example, the middleware 943 may perform scheduling or load balancing on the at least one job request by processing the at least one job request according to the priority assigned to the at least one job request.

The API 945, as an interface for allowing the application program 947 to control a function provided from the kernel 941 or the middleware 943, may include at least one interface or function (for example, an instruction) for file control, window control, image processing, or character control.

The input/output interface 950, for example, may serve as an interface for delivering instructions or data inputted from a user or another external device to another component(s) of the electronic device 901. Additionally, the input/output interface 950 may output instructions or data received from another component(s) of the electronic device 901 to a user or another external device.

The display 960, for example, may include a liquid crystal display (LCD), a light emitting diode (LED) display, an organic light emitting diode (OLED) display, a microelectromechanical systems (MEMS) display, or an electronic paper display. The display 960 may display various content (for example, text, image, video, icon, symbol, and so on) to a user. The display 960 may include a touch screen, and for example, may receive a touch, gesture, proximity, or hovering input by using an electronic pen or a user's body part.

The communication interface 970, for example, may set a communication between the electronic device 901 and an external device (for example, the first external electronic device 902, the second external electronic device 904, or the server 906). For example, the communication interface 970 may communicate with an external device (for example, the second external electronic device 904 or the server 906) in connection to the network 962 through wireless communication or wired communication.

The wireless communication may use at least one of LTE, LTE-A, CDMA, WCDMA, UMTS, WiBro, or GSM as a cellular communication protocol, for example. Additionally, the wireless communication, for example, may include a short-range communication 964. The short range communication 964, for example, may include at least one of wireless fidelity (WiFi), Bluetooth (BT), near field communication (NFC), global positioning system (GPS), and so on. The wired communication, for example, may include at least one of universal serial bus (USB), high definition multimedia interface (HDMI), recommended standard 232 (RS-232), and plain old telephone service (POTS). The network 962 may include telecommunications network, for example, at least one of computer network (for example, LAN or WAN), internet, and telephone network.

Each of the first and second external electronic devices 902 and 904 may be the same or different type of the electronic device 901. According to an embodiment of the present disclosure, the server 906 may include a group of one or more servers. According to various embodiments of the present disclosure, all or part of operations executed on the electronic device 901 may be executed on another one or more electronic devices (for example, the electronic device 902 or 904 or the server 906). According to an embodiment of the present disclosure, when the electronic device 901 performs a certain function or service automatically or by a request, it may request at least part of a function relating thereto from another device (for example, the electronic device 902 or 904 or the server 906) instead of or in addition to executing the function or service by itself. The other electronic device (for example, the external electronic device 902 or 904 or the server 906) may execute a requested function or an additional function and may deliver an execution result to the electronic device 901. The electronic device 901 may provide the requested function or service as it is or by processing the received result additionally. For this, for example, cloud computing, distributed computing, or client-server computing technology may be used.

Figure 10:
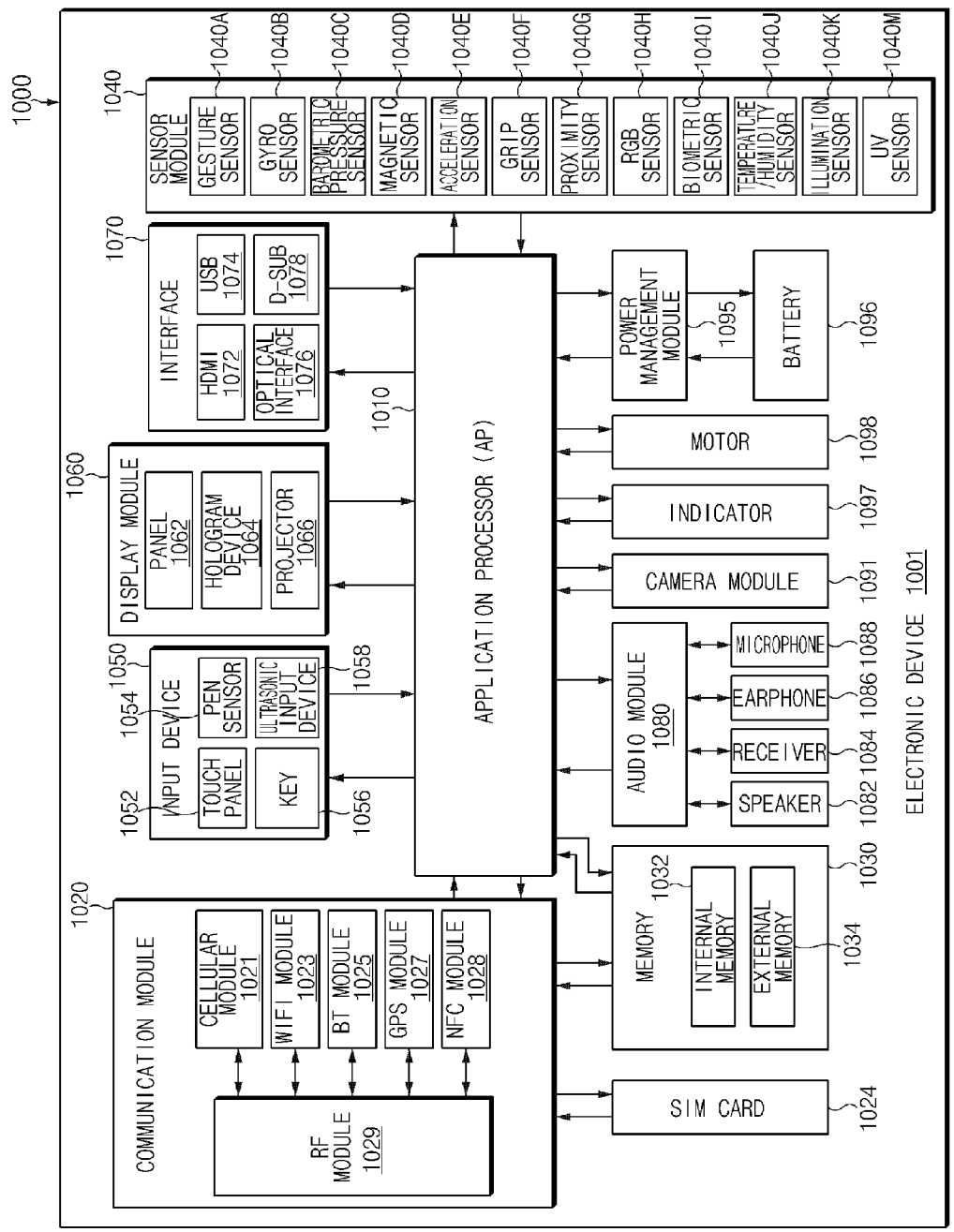
FIG. 10 is a block diagram of an electronic device according to various embodiments of the present disclosure.

FIG. 10 is a block diagram 1000 of an electronic device 1001 according to various embodiments of the present disclosure.

Referring to FIG. 10, an electronic device 1001, for example, may configure all or part of the above-mentioned electronic device 901 shown in FIG. 9. The electronic device 1001 may include at least one processor (for example, an application processor (AP) 1010), a communication module 1020, a subscriber identification module (SIM) 1024, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may be configured to control a plurality of hardware or software components connected thereto and also may be configured to perform various data processing and operations by executing an operating system or an application program. The processor 1010 may be implemented with a system on chip (SoC), for example. According to an embodiment of the present disclosure, the processor 1010 may further include a graphic processing unit (GPU) (not shown) and/or an image signal processor. The processor 1010 may include at least part (for example, the cellular module 1021) of components shown in FIG. 10. The processor 1010 may be configured to load commands or data received from at least one of other components (for example, nonvolatile memory) and to process them and may store various data in a nonvolatile memory.

The communication module 1020 may have the same or similar configuration to the communication interface 970 of FIG. 9. The communication module 1020 may, for example, include a cellular module 1021, a WiFi module 1023, a BT module 1025, a GPS module 1027, an NFC module 1028, and a radio frequency (RF) module 1029.

The cellular module 1021, for example, may provide voice call, video call, text service, or internet service through communication network. According to an embodiment of the present disclosure, the cellular module 1021 may perform a distinction and authentication operation on the electronic device 1001 in a communication network by using a SIM (for example, a SIM card) 1024. According to an embodiment of the present disclosure, the cellular module 1021 may perform at least part of a function that the processor 1010 provides. According to an embodiment of the present disclosure, the cellular module 1021 may further include a communication processor (CP).

Each of the WiFi module 1023, the BT module 1025, the GPS module 1027, and the NFC module 1028 may include a processor for processing data transmitted/received through a corresponding module. According to an embodiment of the present disclosure, at least part (for example, at least one) of the cellular module 1021, the WiFi module 1023, the BT module 1025, the GPS module 1027, and the NFC module 1028 may be included in one integrated chip (IC) or IC package.

The RF module 1029, for example, may transmit/receive communication signals (for example, RF signals). The RF module 1029, for example, may include a transceiver, a power amp module (PAM), a frequency filter, a low noise amplifier (LNA), or an antenna. According to another embodiment of the present disclosure, at least one of the cellular module 1021, the WiFi module 1023, the Bluetooth module 1025, the GPS module 1027, and the NFC module 1028 may transmit/receive RF signals through a separate RF module.

The SIM 1024, for example, may include a card including a SIM and/or an embedded SIM and also may include unique identification information (for example, an integrated circuit card identifier (ICCID)) or subscriber information (for example, an international mobile subscriber identity (IMSI)).

The memory 1030 (for example, the memory 930) may include an internal memory 1032 or an external memory 1034. The internal memory 1032 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash memory or NOR flash memory), hard drive, or solid state drive (SSD)).

The external memory 1034 may further include flash drive, for example, compact flash (CF), secure digital (SD), micro Micro-SD, Mini-SD, extreme digital (xD), (MultiMediaCard (MMC), or a memorystick. The external memory 1034 may be functionally and/or physically connected to the electronic device 1001 through various interfaces.

The sensor module 1040 measures physical quantities or detects an operating state of the electronic device 1001, thereby converting the measured or detected information into electrical signals. The sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (for example, a red, green, blue (RGB) sensor), a biometric sensor 1040I, a temperature/humidity sensor 1,040J, an illumination sensor 1040K, and an ultra violet (UV) sensor 1040M. Additionally or alternatively, the sensor module 1040 may include an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 1040 may further include a control circuit for controlling at least one sensor therein. According to an embodiment of the present disclosure, the electronic device 1001 may further include a processor configured to control the sensor module 1040 as part of or separately from the processor 1010 and thus may control the sensor module 1040 while the processor 1010 is in a sleep state.

The input device 1050 may include a touch panel 1052, a (digital) pen sensor 1054, a key 1056, or an ultrasonic input device 1058. The touch panel 1052 may use at least one of capacitive, resistive, infrared, or ultrasonic methods, for example. Additionally, the touch panel 1052 may further include a control circuit. The touch panel 1052 may further include a tactile layer to provide tactile response to a user.

The (digital) pen sensor 1054, for example, may include a sheet for recognition as part of a touch panel or a separate sheet for recognition. The key 1056 may include a physical button, an optical key, or a keypad, for example. The ultrasonic input device 1058 may detect ultrasonic waves generated from an input tool through a microphone (for example, the microphone 1088) in order to check data corresponding to the detected ultrasonic waves.

The display 1060 (for example, the display 960) may include a panel 1062, a hologram device 1064, or a projector 1066. The panel 1062 may have the same or similar configuration to the display 960 of FIG. 9. The panel 1062 may be implemented to be flexible, transparent, or wearable, for example. The panel 1062 and the touch panel 1052 may be configured with one module. The hologram 1064 may show three-dimensional images in the air by using the interference of light. The projector 1066 may display an image by projecting light on a screen. The screen, for example, may be placed inside or outside the electronic device 1001. According to an embodiment of the present disclosure, the display 1060 may further include a control circuit for controlling the panel 1062, the hologram device 1064, or the projector 1066.

The interface 1070 may include a high-definition multimedia interface (HDMI) 1072, a universal serial bus (USB) 1074, an optical interface 1076, or a D-subminiature (sub) 1078, for example. The interface 1070, for example, may be included in the communication interface 970 shown in FIG. 9. Additionally or alternatively, the interface 1070 may include a mobile high-definition link (MHL) interface, a secure Digital (SD) card/multi-media card (MMC) interface, or an infrared data association (IrDA) standard interface.

The audio module 1080 may convert sound into electrical signals and convert electrical signals into sounds. At least some components of the audio module 1080, for example, may be included in the input/output interface 950 shown in FIG. 9. The audio module 1080 may process sound information inputted/outputted through a speaker 1082, a receiver 1084, an earphone 1086, or a microphone 1088.

The camera module 1091, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 1095 may manage the power of the electronic device 1001. According to an embodiment of the present disclosure, the power management module 1095 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 1096, or a voltage, current, or temperature thereof during charging. The battery 1096, for example, may include a rechargeable battery and/or a solar battery.

The indicator 1097 may display a specific state of the electronic device 1001 or part thereof (for example, the processor 1010), for example, a booting state, a message state, or a charging state. The motor 1098 may convert electrical signals into mechanical vibration and may generate vibration or haptic effect. Although not shown in the drawings, the electronic device 1001 may include a processing device (for example, a GPU) for mobile TV support. A processing device for mobile TV support may process media data according to the standards such as digital multimedia broadcasting (DMB), digital video broadcasting (DVB), or mediaFLO™.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components may be performed identically.

Figure 11:
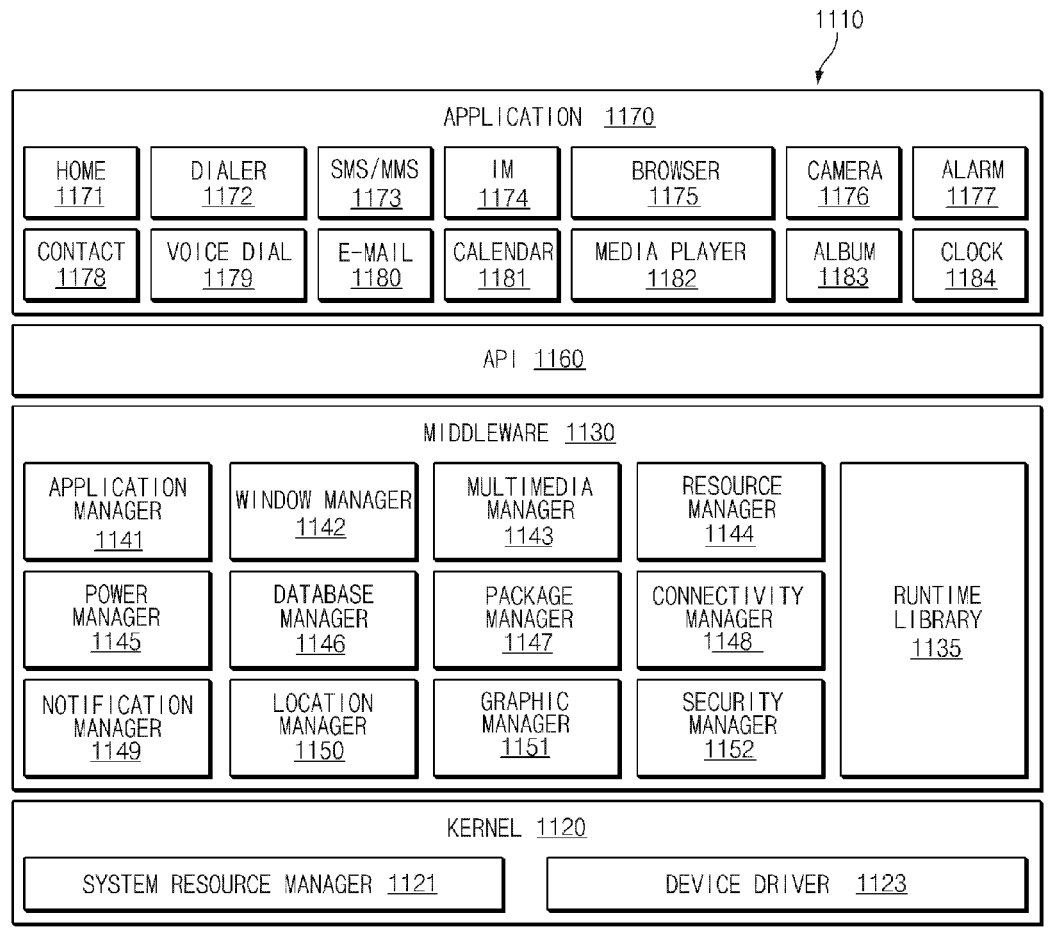
FIG. 11 is a block diagram illustrating a program module according to various embodiments of the present disclosure.

FIG. 11 is a block diagram 1100 illustrating a program module 1110 according to various embodiments of the present disclosure.

Referring to FIG. 11, according to an embodiment of the present disclosure, a program module 1110 (for example, the program 940) may include an operating system (OS) for controlling a resource relating to an electronic device (for example, the electronic device 901) and/or various applications (for example, the application program 947) running on the OS. The OS, for example, may include android, iOS, windows, symbian, tizen, or bada.

The program module 1110 may include a kernel 1120, a middleware 1130, an API 1160, and/or an application 1170. At least part of the program module 1110 may be preloaded on an electronic device or may be downloaded from a server (for example, the electronic devices 902 and 904 and the server device 906).

The kernel 1120 (for example, the kernel 941), for example, may include a system resource manager 1121, or a device driver 1123. The system resource manager 1121 may perform the control, allocation, or retrieval of a system resource. According to an embodiment of the disclosure, the system resource manager 1121 may include a process management unit, a memory management unit, or a file system management unit. The device driver 1123, for example, may include a display driver, a camera driver, a Bluetooth driver, a sharing memory driver, a USB driver, a keypad driver, a WiFi driver, an audio driver, or an inter-process communication (IPC) driver.

The middleware 1130, for example, may provide a function that the application 1170 requires commonly, or may provide various functions to the application 1170 through the API 1160 in order to allow the application 1170 to efficiently use a limited system resource inside the electronic device. According to an embodiment of the disclosure, the middleware 1130 (for example, the middleware 943) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, and a security manager 1152.

The runtime library 1135, for example, may include a library module that a complier uses to add a new function through a programming language while the application 1170 is running. The runtime library 1135 may perform a function on input/output management, memory management, or an arithmetic function.

The application manager 1141, for example, may mange the life cycle of at least one application among the applications 1170. The window manager 1142 may manage a GUI resource used in a screen. The multimedia manager 1143 may recognize a format for playing various media files and may encode or decode a media file by using the codec corresponding to a corresponding format. The resource manager 1144 may manage a resource such as a source code, a memory, or a storage space of at least any one of the applications 1170.

The power manager 1145, for example, may operate together with a basic input/output system (BIOS) to manage the battery or power and may provide power information necessary for an operation of the electronic device. The database manager 1146 may create, search, or modify a database used in at least one application among the applications 1170. The package manager 1147 may manage the installation or update of an application distributed in a package file format.

The connectivity manger 1148 may manage a wireless connection such as WiFi or Bluetooth. The notification manager 1149 may display or notify an event such as arrival messages, appointments, and proximity alerts to a user in a manner of not interrupting the user. The location manager 1150 may manage location information on an electronic device. The graphic manager 1151 may manage a graphic effect to be provided to a user or a user interface relating thereto. The security manager 1152 may provide various security functions necessary for system security or user authentication. According to an embodiment, when an electronic device (for example, the electronic device 901) includes a phone function, the middleware 1130 may further include a telephony manager for managing a voice or video call function of the electronic device.

The middleware 1130 may include a middleware module for forming a combination of various functions of the above-mentioned components. The middleware 1130 may provide a module specialized for each type of OS to provide differentiated functions. Additionally, the middleware 1130 may delete part of existing components or add new components dynamically.

The API 1160 (for example, the API 945), for example, as a set of API programming functions, may be provided as another configuration according to OS. For example, in the case of android or iOS, one API set may be provided for each platform and in the case Tizen, at least two API sets may be provided for each platform.

The application 1170 (for example, the application program 947) may include at least one application for providing functions such as a home 1171, a dialer 1172, an SMS/MMS 1173, an instant message 1174, a browser 1175, a camera 1176, an alarm 1177, a contact 1178, a voice dial 1179, an e-mail 1180, a calendar 1181, a media player 1182, an album 1183, a clock 1184, health care (for example, measure an exercise amount or blood sugar), or environmental information provision (for example, provide air pressure, humidity, or temperature information).

According to an embodiment, the application 1170 may include an application (hereinafter referred to as "information exchange application") for supporting information exchange between the electronic device (for example, the electronic device 901) and an external electronic device (for example, the electronic devices 902 and 904). The information exchange application, for example, may include a notification relay application for relaying specific information to the external device or a device management application for managing the external electronic device.

For example, the notification relay application may have a function for relaying to an external electronic device (for example, electronic devices 902 and 904) notification information occurring from another application (for example, an SMS/MMS application, an e-mail application, a health care application, or an environmental information application) of the electronic device. Additionally, the notification relay application may receive notification information from an external electronic device and may then provide the received notification information to a user.

The device management application, for example, may manage (for example, install, delete, or update) at least one function (turn-on/turn off of the external electronic device itself (or some components) or the brightness (or resolution) adjustment of a display) of an external electronic device (for example, the electronic devices 902 and 904) communicating with the electronic device, an application operating in the external electronic device, or a service (for example, call service or message service) provided from the external device.

According to an embodiment of the disclosure, the application 1170 may include a specified application (for example, a health care application of a mobile medical device) according to the property of an external electronic device (for example, the electronic devices 902 and 904). According to an embodiment, the application 1170 may include an application received from an external electronic device (for example, the server 906 or the electronic device 902 or 904). According to an embodiment of the disclosure, the application 1170 may include a preloaded application or a third party application downloadable from a server. The names of components in the program module 1110 according to the shown embodiment may vary depending on the type of OS.

According to various embodiments of the present disclosure, at least part of the program module 1110 may be implemented with software, firmware, hardware, or a combination thereof. At least part of the programming module 1110, for example, may be implemented (for example, executed) by a processor (for example, the processor 1010). At least part of the programming module 1110 may include a module, a program, a routine, sets of instructions, or a process to perform at least one function, for example.

According to various embodiments of the present disclosure, by configuring a wearing part of a wearable electronic device with a flexible display, a large display may be used thereby improving the utilization of the electronic device.

Additionally, according to various embodiments of the present disclosure, by supporting a deformation of a wearable electronic device easily and quickly through a tucked unit, the portability may be improved.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of circuitry, configurable circuitry, an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 920) executes an instruction, it may perform a function corresponding to the instruction. The non-transitory computer-readable storage media may include the memory 930, for example.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

According to various embodiments of the present disclosure, in relation to a storage medium for storing a computer readable instruction, the instruction may be set to perform determining whether to tuck blocks of a display divided into the plurality of blocks when the instruction is executed by at least one processor and displaying information on at least one block except for the tucked block among the blocks. Instructions for performing the above-mentioned various methods may be further stored in the storage medium.

A module or a programming module according to various embodiments of the present disclosure may, for example, include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

Moreover, the embodiments disclosed herein are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A wearable electronic device comprising:
   a flexible display including a plurality of blocks, wherein the plurality of blocks comprise a first block, a second block adjacent to the first block, and a third block adjacent to the second block, the second block including magnetic elements; and a processor electrically connected to the flexible display, wherein the magnetic elements are disposed at each end of the second block configured to be folded, the magnetic elements being configured to connect the first block and the third block to each other from among the plurality of blocks by connecting each end of the second block when the second block is folded, and wherein the processor is configured to:
control the flexible display to display information on a first screen including the first block, the second block, and the third block; and
in response to detecting that the first block and the third block are connected to each other, control the flexible display to display the information on a second screen including the first block and the third block and excluding the second block.

2. The wearable electronic device of claim 1, further comprising at least one of:
at least one groove disposed in a predetermined area of the display and configured to induce the second block configured to be folded to be folded in a bottom direction of the display; and
a connection unit disposed at each end of the display and configured to couple each end of the display.

3. The wearable electronic device of claim 1, further comprising at least one sensor disposed in a predetermined area of the display and configured to sense whether the display is folded.

4. The wearable electronic device of claim 3, wherein the sensor comprises a proximity sensor and is disposed in an area adjacent to the magnetic elements.

5. The wearable electronic device of claim 3, wherein the sensor comprises a flexible bend sensor.

6. The wearable electronic device of claim 1, wherein the processor is further configured to control the electronic device not to display a screen of at least one block whose angle formed by a normal direction of the screen and a viewing direction is outside a predetermined angle range.

7. The wearable electronic device of claim 1, wherein the processor is further configured to control the electronic device to change a screen output state of at least one block selected by an input.

8. The wearable electronic device of claim 7, wherein the input comprises at least one of a touch, a gesture, an approach, a hovering, and a voice input.

9. The wearable electronic device of claim 7, wherein the processor is further configured to control the electronic device to output a list of applications installed in the electronic device when the screen output state is changed from a turn-off state into a turn-on state.

10. The wearable electronic device of claim 9, wherein the processor is further configured to control the electronic device to output an execution screen of an application selected from the list of applications.

11. The wearable electronic device of claim 1, wherein the processor is further configured to control the electronic device to output information relating to a specific application to at least one block adjacent to a specific block when different application execution screens are respectively output to the plurality of blocks or an execution screen of the specific application is output to the specific block.

12. A method of setting a display area of a display of a wearable electronic device, comprising:
displaying information on a first screen including a first block, a second block adjacent to the first block, and a third block adjacent to the second block among a plurality of blocks divided in the display;
determining whether the second block is folded; and
in response to determining that the second block is folded, displaying the information on a second screen including the first block and the third block and excluding the second block.

13. The method of claim 12, wherein the determining comprises making a determination based on at least one sensor disposed in a predetermined area of the display.

14. The method of claim 12, wherein the displaying comprises controlling the electronic device not to display a screen of at least one block whose angle formed by a normal direction of the screen and a viewing direction is outside a predetermined angle range.

15. The method of claim 12, further comprising changing a screen output state of at least one block selected by an input received by the electronic device.

16. The method of claim 15, the changing of the screen output state comprises selecting at least one block from the plurality of blocks based on a touch input.

17. The method of claim 15, further comprising outputting a list of applications installed in the electronic device when the screen output state is changed from a turn-off state into a turn-on state.

18. The method of claim 17, further comprising, outputting an execution screen of an application corresponding to a selected item when a specific item is selected from the list of applications.

19. The method of claim 12, further comprising at least one of:
respectively outputting different application execution screens to the plurality of blocks; and
outputting information relating to a specific application to at least one block adjacent to a specific block when outputting an execution screen of the specific application to the specific block.

* * * * *